Patented Mar. 2, 1948

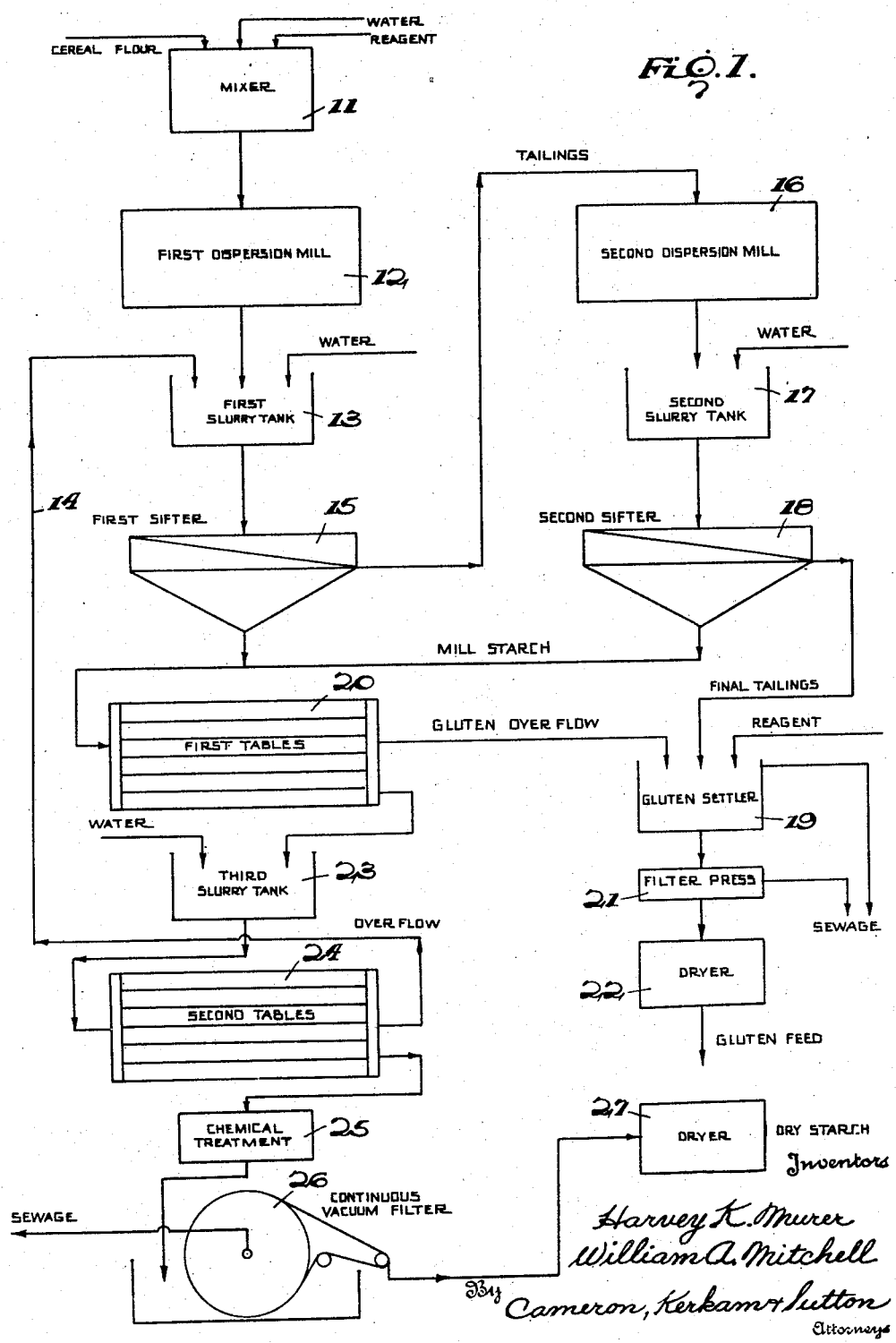

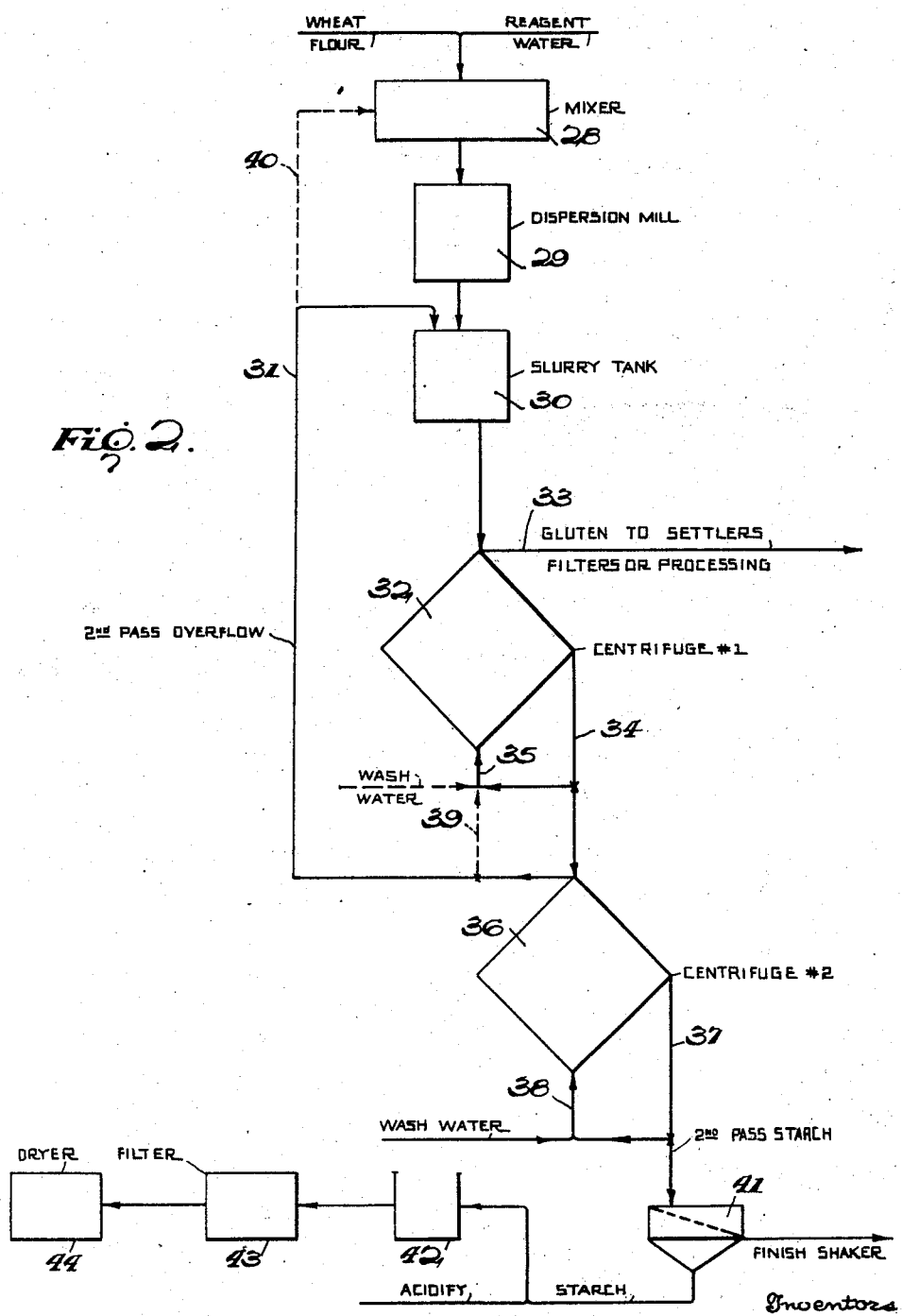

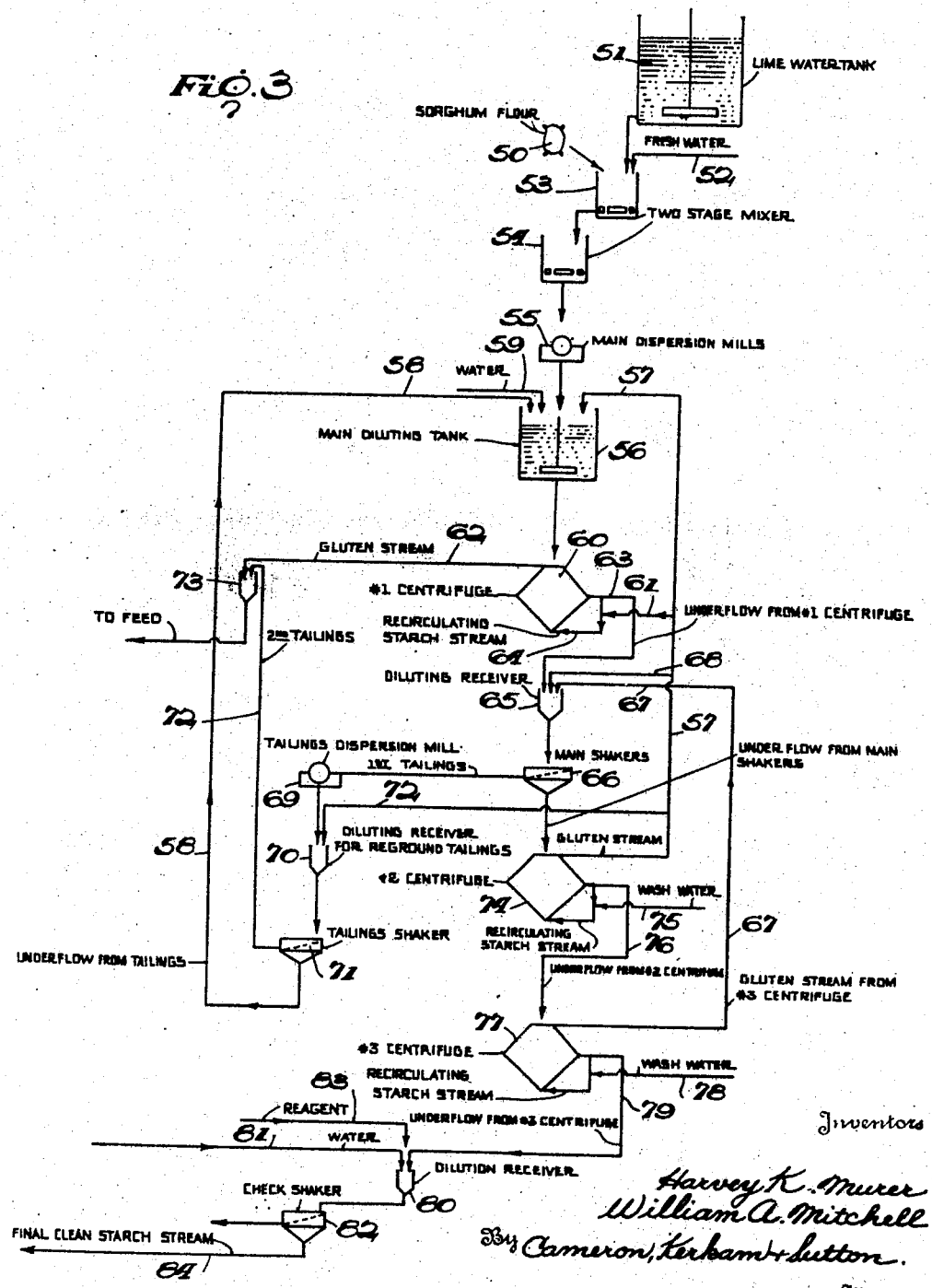

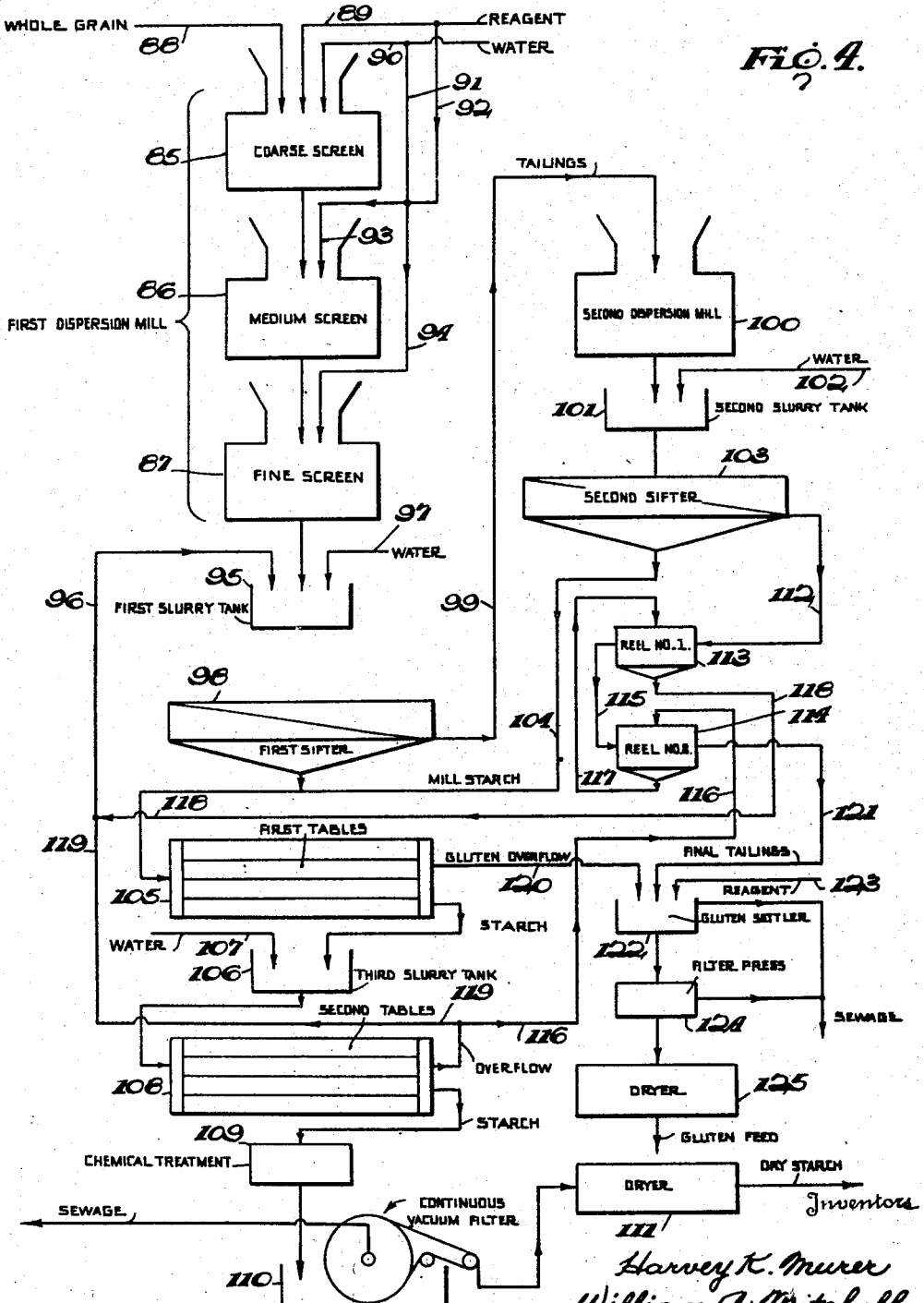

2,437,036

UNITED STATES PATENT OFFICE 2,437,036

PRODUCTION OF STARCH FROM CEREAL GRAINS

Harvey K. Murer, Summit, and William A. Mitchell, Cedar Grove, N. J., assignors to General Foods Corporation, New York, N. Y., a corporation of Delaware Application December 22, 1943, Serial No. 515,284

22 Claims. (Cl. 127—67)

This invention relates to the production of starch from cereal grains, such as corn, wheat, sorghum, rice, etc.

In cereal grains, the starch granules are surrounded by or embedded in adherent protein matter or gluten, and the separation of the starch from this gluten is the chief problem in cereal starch manufacture. Milling, grinding or otherwise comminuting the grain, as involved in various known procedures for handling cereal grains, results in freeing or releasing some of the starch granules and such free starch can be recovered by known settling or centrifuging methods. It has also been proposed to increase the effectiveness of such procedures by whipping or beating a water slurry of the comminuted grain in order to separate the free starch granules from adhering gluten. However, the gluten rapidly becomes jellified when brought into contact with water, forming gelatinous masses from which the greater part of the starch cannot be released by such procedures. Hence the yield of starch so obtained is low, and such processes are practicable only in conjunction with a satisfactory market for the remaining starch-gluten mixture, for example, in conjunction with bakeries and the like.

From the standpoint of starch production with practicably high yields, it has heretofore been considered necessary to modify the nature of the gluten so that it can be readily dispersed in water to release the embedded starch granules. The general practice which has been followed for many years with most cereal grains to accomplish this result is to steep the grain for prolonged periods. In early processes fermentation took place during steeping and assisted in modifying the nature and properties of the gluten. However, fermentation is objectionable for reasons set forth below and is largely avoided in modern starch manufacture by the use of sulphur dioxide in the steep water. Other factors to which the effects of steeping have been attributed include the presence of various bacteria and enzymes. Whatever the cause, however, the result of steeping is that the gluten loses its tough and starch-binding properties and the starch granules are freed from mechanical bondage with the gluten. Upon subsequent grinding in the ordinary buhrstone mill, the cellular structure of the grain is broken and the starch is thereby released for recovery by settling or centrifuging.

An exception to the above general practice is in the case of wheat where fermentation must be allowed to take place during steeping in order to destroy the gluten, or else it remains gelatinous and cohesive and can not be dispersed as described above to permit starch separation. Since fermentation is undesirable for reasons pointed out hereinafter, wheat starch is usually separated from the gluten by prolonged kneading of a starch-gluten dough in a stream of water.

Although steeping is in general use, it is undesirable for many reasons. It must be carried out under conditions inhibiting fermentation because of the offensive nature of the fermentation, the resulting destruction of the gluten as a useful by-product, etc. However, in spite of the use of fermentation inhibitors such as sulphur dioxide, some fermentation is likely to take place, necessitating frequent cleaning of large amounts of equipment such as steeping tanks, degerminating mills, germ flotation tanks, germ washing reels, buhrstone grinding mills, mill starch washing reels and shakers, etc., if sanitary conditions are to be maintained. Also the time required for steeping (about 24-48 hours) is excessive, and the plant space and equipment requirements are objectionable.

Moreover, steeping is detrimental to the products of starch manufacture. For instance, it usually causes some deterioration of protein matter despite measures taken to inhibit fermentation. A considerable portion of the protein matter is solubilized and extracted by the steeping water along with soluble carbohydrates and mineral salts; this solubilized protein amounting in the case of corn to as much as 34% of the total protein matter of the grain. The solubilizing of such large amounts of protein clearly indicates the change in the nature of the proteins that is brought about by steeping. In the case of colored varieties of grain such as sorghum, moreover, steeping tends to cause discoloration of the starch by contamination with pigment present in the embryo and bran layers.

On the other hand, the exposure of the starch to chemical treatment over prolonged periods results in undesirable alteration of the natural properties of the starch. For example, the so-called "waxy starches," which are stained red brown by iodine instead of blue, are found in certain hybrid varieties of corn and other cereals. These waxy starches naturally possess physical properties such as high viscosity which adapt them to industrial uses for which tapioca starch is generally employed; for example, in remoistening glues, gums, paper sizes, puddings and like food products, etc. However, prolonged steeping decidedly alters these properties, the naturally high viscosity of waxy corn starch for instance being reduced almost to that of ordinary corn starch by the usual steeping in sulphur dioxide water.

Other important practical considerations make steeping undesirable. For instance, it requires the use of very large volumes of water, and necessitates costly evaporation operations if the extracted solubles are to be recovered. Moreover, the use of chemical reagents such as sulphur dioxide is objectionable from the standpoint of corrosion of equipment and concrete floors and walls, as well as from the standpoint of adverse physiological effects.

One of the objects of the invention is to provide a novel process for the production of starch from cereals in which the gluten is dispersed to liberate the starch without the steeping or kneading characteristic of processes heretofore used.

Another object is to provide a standard process which can be applied to any cereal grain to produce high yields of pure colorless starch.

Another object is to avoid the prolonged exposure of the starch to chemical treatment and the consequent modification of its natural characteristics which often takes place.

A further object is to make possible a wider choice of chemical reagents by eliminating the harmful effects caused by prolonged exposure of the starch to such agents.

Another object is to permit the dry milling of the grain with its attendant advantages including cheaper recovery of by-products in dry form.

A still further object is to avoid the extraction of solubles (carbohydrates, mineral salts and proteins) incident to steeping.

Another object is to avoid all fermentation resulting from prolonged treatment of the grain in water, thereby also eliminating the need for fermentation inhibitors and their adverse effects.

Still further objects are to provide a process which can be operated continuously for long periods while maintaining sanitary conditions, and one which also makes possible the use of simpler and more sanitary types of equipment.

Additional objects are to reduce the number of wet operations and to shorten the period required for these operations, as well as to reduce the quantity of water required to a minimum and to minimize sewerage disposal problems; and in general to reduce equipment and operating costs and the time involved in the production of cereal starches and the by-products of their manufacture.

In its broad aspect, the invention is predicated on the discovery that when the gluten of cereal grains is brought into contact with water, it is rapidly hydrated to the state of a colloidal gel which possesses thixotropic properties and can be liquefied by mechanical treatment, thereby freeing or releasing substantially all of the starch granules without steeping or equivalent processing as described above. The speed of hydration depends, of course, on the time required for the water to penetrate the grain particles, but jellification of the gluten takes place almost immediately as it comes into contact with water. When the wet product is examined under the microscope, the starch granules will be found embedded in swollen irregularly shaped and sized particles of jellified gluten.

As stated above this jellified gluten has thixotropic properties; that is, the protein-water gel system can be converted to a liquid sol by mechanical treatment such as vigorous shaking, stirring or other agitation, but after the cessation of such treatment the system will return in course of time to the gel condition. When the colloidal gel is thus converted to a sol, further microscopic examination reveals the practically complete liberation of the starch. Even in the case of wheat, where the jellified gluten forms a very coherent mass or dough even after steeping, the gluten gel is nevertheless liquefied and the starch liberated in the same manner.

The liberated starch granules can then be recovered provided that the system does not return to the gel state before separation of the starch can be effected. In the case of most cereal proteins, rejellification takes place only very slowly, and is further delayed by the agitation to which the dispersed slurry is subjected during the subsequent processing necessary to separate and recover the starch. However, rejellification is preferably prevented entirely by addition of excess water to the liquid gel system, this excess water facilitating handling of the materials as pointed out hereinafter.

The invention also includes novel operating techniques and procedures whereby the maximum benefit and advantage of the above discovery may be realized. Thus in order to speed hydration and jellification of the gluten, the grain is preferably comminuted before or as the water for jellification is added, although this is not essential as pointed out hereinafter. If wet comminution is desirable, the water may be fed to the comminuting apparatus either together with or separately from the grain and without preliminary soaking or steeping. When the germ is to be removed, the grain may be put through the usual wet operations of partial disintegrations of the grain and subsequent flotation of the germ and, if desired, further comminution of the grain may be effected before it reaches the dispersion apparatus in which the gluten gel is liquefied. On the other hand, the grain may be comminuted in the dry state (with removal of the germ if desired) by known procedures and the water added after it leaves the comminuting apparatus. Where degermination is unnecessary, the dispersion apparatus itself may serve also to comminute the grain, the whole grain and the necessary water being supplied directly thereto either separately or together to accomplish jellification, comminution and dispersion of the gluten gel in a single operation. These procedures are feasible since hydration and jellification take place very rapidly when the grain is in the comminuted state, and no prolonged steeping is required to modify the gluten.

The amount of water should be at least sufficient to accomplish complete jellification, and preferably enough to form a free-flowing slurry in order to facilitate handling particularly in the dispersion apparatus. Roughly two parts of water to one part of grain are suitable for these purposes, although these proportions may vary. This excess of water above that required for jellification also dilutes the gel system as it is liquefied by the mechanical treatment mentioned above, changing its concentration so that it will not return to the gel condition.

The preferred procedure for most purposes is to mill the grain in the dry state to remove the greater portion of germ and fibrous matter and produce a starch-gluten flour which serves as a starting material in the present process. Although dry milling involves a slight reduction in starch yield, it is often to be preferred to wet grinding because of important advantages in other respects. For instance, substantially all of the germ and outer bran layers of the grain are directly recovered in dry form, and the wet operations necessary for the recovery of the germ from wet ground grain are thus eliminated along with the elaborate equipment and large quantities of water required by these operations. Moreover the germ and fibrous matter may be recovered as separate products, the germ being directly processed for extraction of its oil while the fibrous matter is directly combined with the gluten as gluten feed. On the other hand, the small amount of fibrous matter remaining in the flour can be separated by simple screening operations and relatively small amounts of water.

Furthermore, the greater proportion of solubles in the grain is directly recovered with the germ and outer bran layers removed by dry milling, and although the flour still contains relatively small amounts of soluble protein and sugars, the amount of these solubles lost by subsequent wet processing is so small as to eliminate any need for their recovery. Also substantially all coloring matter naturally associated with the germ and outer bran layers is removed by milling and prevented from contaminating the starch in the wet operations carried out after milling, an advantage which is particularly important with intensely colored varieties of sorghum since substantially colorless starches can thus be produced without any special procedures of purification.

Hence it will be seen that the material to be treated in the dispersion apparatus comprises mainly a gluten gel containing embedded starch granules, preferably carried as separate particles in a free-flowing slurry which may also contain more or less bran, fiber, etc., together with some small amount of free starch, and which may or may not contain the germ as well. The gluten gel is relatively strong and cohesive and the particles withstand ordinary beating and stirring of the slurry as well as relatively high speed agitation without substantial modification. We have found, however, that when the slurry is passed through colloiding apparatus of known types, the liquefaction of the gel can be effectively accomplished with liberation of substantially all of the starch granules. Various types of such apparatus are well known in the art and need not be described in detail herein. In general, the use of colloid mills of the crushing type, such as the pebble mill, is less desirable because of the danger of crushing some of the starch granules. On the other hand, we have obtained good results with colloid mills of the shear and impact types. For example, the slurry may be passed as a thin film between surfaces in rapid relative rotation, as in the well known Premier type of colloid mill, or the slurry may be passed through colloidizing apparatus of the well known hammer mill type.

It will be understood that the efficiency of such apparatus in converting the gluten gel and releasing the starch depends on a number of factors well understood in the art. For example, variations may be made in the diameter and speed of rotor, the spacing of surfaces, the thickness of the slurry, and the rate of feed of the slurry to adjust the apparatus for optimum operation in any case. As illustrations, we have obtained good results with a small laboratory model of the Premier mill with rotor diameter of 3", clearance between surfaces in the range of 0.002" to 0.005", and rotor speed of about 7,200 R. P. M. When using hammer mills, we have found it desirable to use a standard baffled type of internal head or cover the notched internal surface of which prevents the slurry from streaming freely around the periphery of the machine and thus insures more effective impact with the hammers during passage through the machine. Employing such a baffled type of internal head, a No. 1 Mikro-Pulverizer at a speed of 9,000 R. P. M., a No. 2 Mikro-Pulverizer at 6,900 R. P. M., a No. 3 Mikro-Pulverizer at 4,500 R. P. M., and a No. 4 Mikro-Pulverizer at 3,450 R. P. M. have proved satisfactory. It will be apparent, however, that optimum operation does not necessarily require all of the starch granules to be released or liberated in a single pass through the mill. Thus power consumption or the requirements of auxiliary operations may make it economical or otherwise desirable to liberate substantially less than the maximum amount of starch in a single pass through a single mill, and to employ recycling and/or a number of mills in series to obtain complete starch recovery.

Following the dispersion treatment, the slurry may be passed to the usual settling tables or through known centrifuging operations for separation and recovery of the starch, the gluten being separately recovered as a by-product useful in stock feed, etc.

It will be observed that in all of the above cases the steeping process usually employed in the prior art for the purpose of modifying the gluten and destroying its gelatinous character is avoided, and that on the contrary the unsteeped grain is subjected to the dispersion treatment while the gluten is still in the state of a gel. Hence it is preferable to accomplish jellification of the gluten rapidly by comminuting the grain before or as it is mixed with the water. It will be understood, however, that soaking the whole grain without comminution for a period long enough to jellify the gluten is not excluded from the scope of the invention. The time required for the water to penetrate to the centers of the grains in such a case is undesirably long but is nevertheless very much less than required for steeping as that term is understood in the art, and the adverse effects of steeping are reduced correspondingly. On the other hand, while there may be time for some of the gluten in the outer layers to be modified as in steeping before the gluten at the center is jellified, most of the gluten nevertheless remains in the state of a gel and is dispersed or liquefied as described above.

Though the above process may be carried out without the use of chemical reagents, it will generally be desirable to employ certain types for purposes pointed out below, since the usual adverse effects of their use are minimized by the elimination of prolonged exposure of the product thereto. These reagents as well as the results they achieve in the process will vary with different types of grains, but in general they will be employed for the following purposes:

(1) To facilitate jellification and dispersion of the gluten and subsequent separation of the starch (by settling or centrifuging), either an acid or alkaline reagent may be used depending upon the type of grain. In general any soluble acid or alkali is suitable for these purposes, but sulphurous acid or lime is usually preferred for reasons of economy. The use of lime is also of advantage in decreasing protein solubility.

In the case of wheat, for example, sufficient alkali is added to the slurry to bring its pH to a value between 6.8 and 8.5.

In the case of corn, on the other hand, either acid or alkali may be used, but better settling of the starch is obtained with alkali and better dispersion of the gluten is obtained with acid. In general, it is preferred to use alkali and to adjust the pH of the slurry prior to dispersion to a value between 6.5 and 8.0.

In the case of the intensely colored varieties of sorghum, while most of the coloring matter can be removed by dry milling, it is nevertheless desirable that the reagents employed should facilitate the production of entirely colorless starches. Thus adjustment of the pH of the slurry to a value between 6.8 and 7.5 facilitates jellification and dispersion of the gluten and accelerates subsequent separation of the starch, and the use of the proper alkali for this purpose also aids in preventing pigment contamination of the finished starch. Where the coloring matter by weathering or otherwise has penetrated into the endosperm, lime tends to fix the coloring matter to the starch and sodium hydroxide and like alkalies are preferred because they are capable of dissolving the coloring matter from the starch. On the other hand, if the coloring matter has not penetrated into the endosperm such alkalies tend to carry the coloring matter to the starch and it is accordingly preferable to use lime.

With rice, a strong alkali such as sodium hydroxide is desirable, the pH of the slurry preferably being about 9–10.

(2) To facilitate recovery of the gluten (by settling, filtration, or other appropriate procedure), an acid reagent is usually added to the gluten stream resulting from the separation of the starch. While any acid is suitable, sulphurous acid is preferred because of its relatively low cost and its effective bactericidal properties. In the case of wheat, the pH of the gluten stream should be brought to between 5 and 6, while with other grains such as corn, rice and sorghum a pH between 3 and 5 is preferable.

(3) To inhibit bacterial growth during the drying of the starch (with resulting bacterial contamination of the finished starch), an acid reagent is usually employed to bring the pH of the starch slurry to between 3 and 5 before drying of the starch. While any acid is suitable, sulphurous acid is again preferred for the reasons stated, as well as for its bleaching action on the starch. This acid treatment is also effective in removing any insoluble material formed by the prior use of lime in the process. In the case of intensely colored varieties of sorghum it is also desirable to wash the starch with dilute alkali to remove any remaining coloring matter before subjecting it to the aforesaid acid treatment. Any suitable alkali capable of dissolving the coloring matter (e. g., sodium hydroxide) may be used, the washing being most effective at a pH of from 7.5 to 10.0.

(4) It is desirable to treat the starch so as to protect it against the development of rancidity with age, especially where it is to be used in foodstuffs or other products in which rancidity is very objectionable. It has been found that the treatment of the starch with lime is effective in overcoming rancidity development in the finished starch, and for this further reason the use of lime to adjust the pH of the slurry prior to dispersion is to be preferred wherever feasible as discussed above. In the case of rice where a high pH is desired, the lime treatment may be used, supplemented by the addition of sodium hydroxide or other strong alkali.

It may also be desirable to add a suitable antioxidant to the starch, particularly where there is no lime treatment in the process. Various kinds of antioxidants are suitable and can be added to the starch in any suitable way. It is convenient, however, to add the antioxidant to the starch before drying, with due regard to the possible effect of the aforementioned acid treatment on its effectiveness. For example, the effectiveness of gum guaiac as an antioxidant is impaired by the use of sulphurous acid and accordingly, when this particular antioxidant is used, it will be necessary to effect acidification of the starch with other acids as, for example, hydrochloric, phosphoric, sulphuric, acetic, etc. On the other hand, an antioxidant which is effective with any type of acid is the ether extract of sorghum husks. Regardless of the nature of the antioxidant, it can be added before, after, or in conjunction with the acid used for acidification.

The manner in which the suitable antioxidants can best be added will be apparent from their individual properties and need not be set forth in detail herein. By way of example, however, good results have been obtained by the following procedure. Gum guaiac is dissolved in a solvent such as sodium hydroxide and the starch treated with this solution before the acid treatment referred to above. Where alkali is used to remove coloring matter from the starch as described above, the gum guaiac may be added to the alkaline treating solution; otherwise its solution in alkali or other solvent may be added to the starch by a separate step in the process, or incorporated in any water used for dilution prior to the acid treatment. The subsequent acid treatment at a pH of 3 to 5 for the purpose of preventing bacterial action appears also to precipitate the gum guaiac and fix it in the starch granules in a substantially water-insoluble form. This procedure is not claimed herein per se, however, and it will be understood that the invention is not restricted thereto.

The accompanying drawings illustrate procedures suitable for use in practicing the invention, it being assumed in the procedures shown in Figs. 1–3 that dry milling operations have first been carried out according to well known practices of the art, leaving a flour consisting principally of gluten and starch as a starting material. It is to be expressly understood, however, that these particular procedures and flow diagrams are for purposes of illustration only and are not to be taken as a definition of the limits of the invention, reference being had to the appended claims for this purpose.

In the drawings,

Fig. 1 is a flow sheet of a typical procedure embodying the invention and applicable generally to any type of cereal grain;

Fig. 2 illustrates a simplification of the procedure shown in Fig. 1 which may be effected in the case of wheat, for example;

Fig. 3 illustrates a modified form of the procedure shown in Fig. 1 which is also applicable generally to any type of grain, although described hereinafter with particular reference to the production of sorghum starch, and Fig. 4 illustrates a further application of the invention to whole grain.

Referring to Fig. 1, the starch-gluten flour is mixed with the proper proportions of water and reagent in a mixing device 11 of any suitable type, the reagent being of the type previously indicated for use prior to dispersion of the gluten.

The resulting slurry is treated in a colloid mill 12, for example, a hammer mill, where most of the gluten is dispersed with resulting liberation of most of the starch. For more efficient screening, the slurry may then be diluted in a tank 13 with liquid supplied by line 14 (preferably overflow liquor from the second tabling operation) along with water if necessary to bring its specific gravity between 6.5° and 7.5° Baumé. This diluted slurry is passed to a mechanical sifting device 15, for example, a silk screen shaker, where the larger amounts of gluten and starch are separated from the fibrous matter.

The tailings from the sifter 15 often contain undispersed particles of gluten and hence the sifter is preferably designed to dewater the tailings to substantially the same consistency as the original slurry formed in the mixer 11, the dewatered tailings being passed to a second dispersion mill 16 where these particles are dispersed and their contained starch liberated. The resulting slurry is mixed in a tank 17 with sufficient water to bring its specific gravity between 6.5° and 7.5° Baumé and is then passed to a second mechanical sifting device 18, for example, a silk screen shaker, where the gluten and starch are largely separated from the fibrous matter. The final tailings containing fibrous matter are sent to the gluten settling tank 19.

The mill starch from the sifters 15 and 18 may be treated by known methods of tabling or centrifuging to separate and recover the starch. As shown in Fig. 1 by way of example, the suspensions leaving the sifters are combined in a mill starch stream (which has substantially the same specific gravity as the slurries formed in tanks 13 and 17) and this mill starch is passed slowly over inclined troughs or tables 20 on which the starch settles. The gluten stream runs off the tables and flows into the settling tank 19, where it is combined with the final tailings from the sifter 18 and treated with a reagent of the type previously indicated for use prior to recovery of the gluten. After settling the mixture is suitably dewatered as by a filter press 21, the supernatant liquor from tank 19 and the filtrate from filter 21 being sent to waste. The dewatered mixture of gluten and fibrous matter (press cake) is transferred to a dryer 22, from which it is discharged as gluten feed.

The starch is allowed to settle on the tables 20 to a suitable depth and is thereafter flushed off with a suitable amount of water to a collecting tank 23, where it is admixed with more water to bring its specific gravity between 7° and 7.5° Baumé. The resulting slurry is subjected to a second tabling operation on tables 24 which removes practically all remaining gluten, the overflow 14 from these tables being preferably returned to the tank 13 as previously described. The starch deposited on the tables 24 is flushed off and is thereafter treated as indicated at 25 with the reagent or reagents previously mentioned for use prior to drying of the starch. For economy in reagent consumption, it is desirable to employ the minimum amount of water for this treatment of the starch and, where the starch is first treated with alkali and thereafter with acid, it is desirable to wash the starch free from residual alkali prior to its acid treatment. The treated slurry is suitably dewatered, for example, by means of a continuous vacuum filter 26, and transferred to a dryer 27 from which it is discharged as commercial pearl starch.

The operation as described above is a typical example of the production of starch from a starch-gluten flour according to the present invention, but it will be understood that modifications may sometimes be desirable to adapt the process to particular cereals. For example, in the case of wheat the dispersion of the gluten is so effective that only one dispersion treatment is usually necessary. Fig. 2 illustrates a suitable simplification of the above process for producing wheat starch, as well as the substitution of centrifuging for tabling.

In the mixer 28, a low grade wheat flour is mixed with saturated lime water and tap water in the approximate proportions of 840 pounds of flour, 110 gallons of lime water and 165 gallons of tap water. The slurry from the mixer 28 is fed directly to the dispersion mill 29, the rates of feed of materials to the mixer being adjusted to the capacity of the mill. A No. 3 Mikro-Pulverizer at a speed of 4,500 R. P. M. has been found to handle effectively 2,500 pounds of dry wheat flour per hour. A No. 4 Mikro-Pulverizer at a speed of 3,450 R. P. M. has a capacity of 2,700–3,800 pounds of dry wheat flour per hour, depending on the amount of power used.

The dispersed slurry from the mill 29 passes to a slurry tank 30 in which it is diluted to 10–11° Baumé by the overflow 31 from the second centrifuging operation described below, and the diluted slurry is passed to the first centrifuge 32. The major part of the gluten is separated as overflow 33 from the centrifuge and may thereafter be processed as in Fig. 1. The crude starch milk leaving the centrifuge at 34 is partially recycled through the centrifuge at 35, together with wash water, in order to maintain a high Baumé and thus aid in separating the gluten. The remainder of the starch milk is passed to the second centrifuge 36 which operates in the same manner as the first centrifuge, part of the starch stream leaving at 37 being recycled at 38 along with wash water if necessary. The overflow from the second centrifuge is returned at 31 to the tank 30 as described above, or part of it may be recycled through the first centrifuge as shown by the dotted line 39 or delivered to the mixer 28 as shown by the dotted line 40. The centrifuges may be of the well known Merco type, No. B-16 being suitable for the processing of about 3,500 pounds of wheat flour per hour as in the present instance.

Although a large part of the bran was removed with the gluten stream from the first centrifuge, it is usually desirable to pass the starch stream from the last centrifuge to a finishing shaker 41 to remove any remaining bran specks and foreign material, after which the starch is acidified in the tank 42, filtered at 43, and dried at 44.

Fig. 3 may be explained conveniently with respect to the production of starch from sorghum flour, although it will be understood that the procedure is applicable to other cereals as well. The sorghum flour from a supply indicated diagrammatically at 50, lime water from tank 51 and fresh water from the line 52 are fed continuously to the two-stage continuous mixer 53, 54. By way of example, it may be assumed that the rate of feed of the flour is 3,600 pounds per hour, in which case approximately 250 gallons per hour of fresh water and 600 gallons per hour of lime water provide suitable proportions for the slurry. The two-stage mixer is preferred because of the rapid flow of the mixture for the purpose of insuring uniform jellification of the gluten throughout the mix.

From the mixer 54 the slurry is fed to the main dispersion mills 55. Using hammer mills, for example, two No. 3 Mikro-Pulverizers each with a capacity of 1,800 lbs. of dry flour per hour may be employed. The dispersed slurry leaving the mills 55 at the rate of approximately 940 gallons per hour is passed to the tank 56 in which it is diluted for centrifuging to about 12° Baumé. The diluting liquid preferably comprises overflow 57 from the second centrifuge and the underflow 58 from the tailings shaker, both of which are described below, together with fresh water additions through the line 59 if necessary, the total dilution required being about 550 gallons per hour.

The starch is separated from the gluten by a series of three centrifuges, the second of which however is used principally for dewatering the slurry and increasing its specific gravity. For example, a series of three No. B-16 Merco centrifuges may be employed. The diluted slurry from the tank 56 is passed to the first centrifuge 60 at the rate of about 1,500 gallons per hour. Most of the gluten is separated from the starch and leaves the centrifuge through the line 62 at about 1,300 gallons per hour. The starch stream at 17-20° Baumé and containing some gluten and also the tailings leaves through the line 63, part of it being recycled to the centrifuge through line 64 along with about 750 gallons per hour of wash water, which may suitably be provided by the line 61 connected to the overflow 57 from the second centrifuge.

In order to remove the tailings from the starch stream, it is passed to the receiver 65 at the rate of about 1,000 gallons per hour and is diluted to about 7.5° Baumé before it is sent to the shakers 66. The diluting liquid may suitably comprise the gluten stream from the third centrifuge introduced through the line 67 and additional liquid from the overflow line 57 of the second centrifuge which is fed in through the line 68, a total of about 1,550 gallons per hour being required.

The tailings from the shakers 66 may contain some undispersed gluten and accordingly may be sent to a further dispersion mill 69 which may be, for example, a No. 2 Mikro-Pulverizer since the rate of flow of tailings will be only about 300 gallons per hour. From the mill 69 the tailings pass to a receiver 70 in which they are diluted back to about 7° Baumé before being sent to a tailings shaker 71. The diluting liquid at the rate of say 200 gallons per hour is supplied by a line 72, preferably from the overflow line 57 of the second centrifuge. The underflow from the tailings shaker is returned to the diluting tank 56 through the line 58 referred to above. The final tailings are passed through the line 72 to a receiver 73 where they are combined with the gluten stream coming through line 62 from the first centrifuge for use as stock feed, etc.

The starch stream leaving the shakers 66 at the rate of about 2,300 gallons per hour is too dilute for further treatment and must be suitably dewatered. For this purpose the stream is passed into a second centrifuge 74 which separates it into starch and gluten streams, the separated starch stream being partly recycled with wash water supplied through a line 75 at the rate of about 450 gallons per hour. This centrifuge may be the same in construction and operation as the centrifuge 60 described above. The starch is washed with fresh water and some purification takes place, but the primary purpose is to increase the specific gravity of the starch stream for efficient separation in the third centrifuge and other suitable means, may be employed for this purpose. The overflow leaves the second centrifuge through the line 57 at the rate of about 1,700 gallons per hour and is used for the purposes described above. The thickened starch stream leaves through the line 76 at the rate of about 1,100 gallons per hour and is fed to a third centrifuge 77 which separates it into starch and gluten streams, the separated starch stream being partly recycled with fresh water supplied through the line 78 at the rate of about 800 gallons per hour. This centrifuge is preferably the same in type and operation as those referred to above. The overflow leaves through the line 67 mentioned above at the rate of about 1,100 gallons per hour and is delivered to the receiver 65 in which it is combined with the slurry of starch and tailings from the first centrifuge as described above.

The final starch stream leaves the third centrifuge 77 through the line 79 at the rate of approximately 800 gallons per hour. It may be directly filtered and dried, but as it may contain some bran specks, a final check shaker may be employed. In the latter case the starch stream is delivered to a receiver 80 in which it is diluted with water coming from line 81 to about 7° Baumé before being passed to the check shaker 82. If an acid reagent only is employed, it may be added to the starch in the receiver 80 through the reagent line 83. If prior alkali treatment is desired, the alkali may be added through the line 83, the starch stream leaving the check shaker through line 84 being then dewatered and washed free of alkali before adding the acid. In any event the starch stream is suitably filtered and dried, producing a yield of approximately 2,900 pounds of commercial starch per hour (10-13% moisture).

In the case of rice, centrifuging is preferred to tabling because of the small size of the starch granules, and the system shown in Fig. 3 may be employed. The rice flour is mixed with water in the proportions of two parts by weight of water to one of flour and the pH of the slurry is adjusted to about 9.25 by the addition of sodium hydroxide. This slurry is passed through the dispersion mills 55 to the tank 56 where it is diluted to 12° Baumé and supplied to the centrifuge 60, etc., as described in connection with Fig. 3.

Corn starch may also be produced by the procedures described above. For example, the system of Fig. 3 and the sequence of operations described above with reference to sorghum are equally applicable to corn.

In processing whole grain instead of flour, certain modifications of the above procedures are desirable. Where comminution and dispersion are to be effected together rather than as separate operations, the large size of the unground grain usually requires the use of a series of dispersion mills, the successive mills preferably having progressively finer retaining screens. Moreover, the bulk of the tailings streams are increased due to the larger amounts of fibrous material from the outer hulls, and to avoid loss of starch with such large volumes of bulky material, it is desirable to wash this fibrous material in a suitable washing system, for example, in countercurrent washing reels of a type well known in the art.

By way of example, Fig. 4 illustrates the application of these modifications to the system shown in Fig. 1. The mixer 11 used in Fig. 1 for processing flour is not required, the whole grain, water and reagent being supplied directly to the first unit 85 of a series of main or first dispersion mills here shown as three in number. This mill 85 is provided with a relatively coarse retaining screen, the second and third mills 86 and 87 respectively having medium and fine retaining screens. The whole grain is supplied to the first mill at 88, reagent at 89, and water at 90. The slurry passes in succession through mills 85, 86 and 87, and it may be found advantageous to introduce part of the reagent and water required into the second and third mills by means of the lines 91, 92, 93 and 94.

The slurry leaving the mill 87 is passed to a tank 95, where it is diluted with liquid recycled through line 96 and with water from line 97 to bring its specific gravity between 6.5° and 7.5° Baumé, and the diluted slurry is then passed to a sifter 98. The tailings from this sifter pass through a line 99 to a second dispersion mill 100 and thence to a tank 101 where they are again diluted with water from a line 102 to 6.5-7.5° Baumé before being sent to a sifter 103. The mill starch leaving this sifter through line 104 is combined with the mill starch from sifter 98 and sent to the first tables. The starch is flushed off these tables to a tank 106 where it is diluted with water from line 107 to 7.0-7.5° Baumé and then sent to the second tables 108. The starch flushed off these tables is subjected to the desired chemical treatment as indicated at 109, filtered at 110, and dried at 111.

As indicated above, the tailings stream leaving the sifter 103 through line 112 is passed through a countercurrent washing reel system comprising reels 113 and 114 connected by a line 115. The washing liquid preferably comprises a portion of the overflow from the second tables 108 which passes through line 116 to the reel 114 and thence through line 117 to the reel 113. The washing liquid leaving reel 113 through line 118 is preferably returned to line 96 and thereby sent to the slurry tank 95 along with the remaining portion of the overflow from the second tables in line 119.

The overflow from the first tables and the final tailings from reel 114 are sent by lines 120 and 121 respectively to a gluten settler 122, the desired reagent being added through line 123. After settling this mixture is passed to a filter press 124 and a dryer 125 and discharged as gluten feed, the supernatant liquor from tank 122 and the filtrate from filter 124 being sent to waste.

From the foregoing description it will be observed, in summary, that the invention makes it possible to eliminate steeping with its attendant disadvantages mentioned above and at the same time provides a process for producing high yields of pure colorless starch with all its natural properties substantially unmodified. These results are accomplished by a standard procedure that is applicable to all cereal grains, being varied only in details but not in principle, and by a simple, continuous and efficient process having marked advantages in reduction of labor, equipment and plant space requirements, processing time, and overall production costs.

While several embodiments of the invention have been illustrated in the drawings and described with particularity, it will be apparent to those skilled in the art that the invention is not restricted to these particular embodiments but is capable of other applications, and also that various changes may be made in the details of the procedure, the apparatus employed, etc., without departing from the spirit of the invention. Reference should therefore be had to the appended claims for a definition of the limits of the invention.

What is claimed is:

1. A process of producing cereal starch from unsteeped grain which comprises mixing the grain with water and subjecting it to mechanical treatment in a colloidizing apparatus, whereby the gluten is jellified and dispersed to release the starch granules, and then separating and recovering the starch.

2. A process of producing cereal starch from unsteeped grain which comprises comminuting and mixing the grain with water for a period sufficient to jellify the gluten, then subjecting the gluten while in the gel state to liquefaction by mechanical treatment of the grain in a colloidizing apparatus to release the starch granules, and then separating and recovering the starch.

3. A process of producing cereal starch from unsteeped grain which comprises comminuting and mixing the grain with water to jellify the gluten, the quantity of water being sufficient to form a flowable slurry, then subjecting the gluten while in the gel state to liquefaction by passing said slurry through colloidizing apparatus to release the starch granules, and then separating and recovering the starch.

4. A process of producing cereal starch from unsteeped grain which comprises mixing the grain with water to form a flowable slurry and passing the slurry through a colloid mill whereby the gluten is jellified and the gluten gel dispersed to the state of a sol, thereby liberating the starch granules, and then separating and recovering the starch.

5. A process of producing cereal starch from unsteeped grain which comprises passing the whole grain together with sufficient water to form a flowable slurry through a colloid mill to jellify the gluten and disperse the gluten gel to the state of a sol, thereby releasing the starch granules, and then separating and recovering the starch.

6. A process of producing cereal starch from unsteeped grain which comprises removing the germ from the grain, mixing the de-germed grain with sufficient water to jellify the gluten and form a flowable slurry and passing the slurry through a colloid mill to disperse the gluten gel to the state of a sol, thereby liberating the starch granules, and then separating and recovering the starch.

7. A process of producing cereal starch from unsteeped grain which comprises dry milling the grain to remove the germ and outer layers, mixing the milled grain with water to jellify the gluten, passing the wet grain through a colloid mill to disperse the gluten gel to the state of a sol, thereby liberating the starch granules, and separating and recovering the starch.

8. A process of producing cereal starch from a starch-gluten cereal flour which comprises the steps of mixing the flour with water to jellify the gluten, then passing the mixture of flour and water through a colloid mill to disperse the gluten gel to the state of a sol, thereby liberating the starch granules, and then separating and recovering the starch.

9. A process of producing cereal starch from unsteeped grain which comprises mixing the grain with sufficient water to jellify the gluten and form a flowing slurry stream and passing the stream through a colloid mill whereby the gluten is jellified and the gluten gel dispersed to the state of a sol, thereby liberating the starch granules, then centrifuging the stream to separate the starch granules, and then recovering and drying the starch.

10. A process of producing cereal starch from a starch-gluten cereal flour which comprises the steps of mixing the flour with water to jellify the gluten and form a flowing slurry stream, passing said stream through a colloid mill to disperse the gluten gel to the state of a sol, thereby liberating the starch granules, then centrifuging the stream to separate the starch granules, and then recovering and drying the starch.

11. A process of producing corn starch from unsteeped corn which comprises mixing the corn with water and passing the wet corn through a colloid mill whereby the gluten is jellified and the gluten gel dispersed to the state of a sol, thereby liberating the starch granules, and separating and recovering the starch.

12. A process of producing corn starch from unsteeped corn which comprises mixing the corn with water to jellify the gluten, adjusting the pH of the slurry to a value between 6.5 and 8.0 by addition of an alkaline reagent, passing the slurry through a colloid mill to disperse the gluten gel to the state of a sol, thereby liberating the starch granules, and separating and recovering the starch.

13. A process of producing corn starch from corn flour which comprises the steps of mixing the flour with water to jellify the gluten and form a flowable slurry, then passing the slurry through a colloid mill to disperse the gluten gel to the state of a sol, thereby liberating the starch granules, and then separating and recovering the starch.

14. A process of producing wheat starch from unsteeped wheat which comprises mixing the wheat with water to jellify the gluten, passing the wet wheat through a colloid mill to disperse the gluten gel to the state of a sol, thereby liberating the starch granules, and separating and recovering the starch.

15. A process of producing wheat starch from unsteeped wheat which comprises mixing the wheat with water to jellify the gluten, adjusting the pH of the slurry to a value between 6.8 and 8.5 by addition of an alkaline reagent, passing the slurry through a colloid mill to disperse the gluten gel to the state of a sol, thereby liberating the starch granules, and separating and recovering the starch.

16. A process of producing wheat starch from wheat flour which comprises the steps of mixing the flour with water to jellify the gluten and form a flowable slurry, then passing the slurry through a colloid mill to disperse the gluten gel to the state of a sol, thereby liberating the starch granules, and then separating and recovering the starch.

17. A process of producing sorghum starch from unsteeped sorghum which comprises mixing the sorghum with water to jellify the gluten, passing the wet sorghum through a colloid mill to disperse the gluten gel to the state of a sol, thereby liberating the starch granules, and separating and recovering the starch.

18. A process of producing sorghum starch from unsteeped sorghum which comprises mixing the sorghum with water to jellify the gluten, adjusting the pH of the slurry to a value between 6.8 and 7.5 by addition of an alkaline reagent, passing the slurry through a colloid mill to disperse the gluten gel to the state of a sol, thereby liberating the starch granules, and separating and recovering the starch.

19. A process of producing sorghum starch from sorghum flour which comprises the steps of mixing the flour with water to jellify the gluten and form a flowable slurry, then passing the slurry through a colloid mill to disperse the gluten gel to the state of a sol, thereby liberating the starch granules, and then separating and recovering the starch.

20. A process of producing cereal starch from unsteeped grain which comprises mixing the grain with sufficient water to jellify the gluten and form a flowable slurry and passing the slurry through a colloid mill whereby the gluten is jellified and the gluten gel dispersed to the state of a sol, thereby liberating the starch granules, separating the starch from the slurry, adding an antioxidant to the starch, and drying the starch.

21. A process of producing cereal starch from unsteeped grain which comprises mixing the grain with sufficient lime water to jellify the gluten and form a flowable slurry and passing the slurry through a colloid mill whereby the gluten is jellified and the gluten gel dispersed to the state of a sol, thereby liberating the starch granules, separating the starch from the slurry, adding an antioxidant to the starch, and drying the starch.

22. A process of producing sorghum starch from unsteeped sorghum which comprises mixing the grain with sufficient water to jellify the gluten and form a flowable slurry and passing the slurry through a colloid mill to disperse the gluten gel to the state of a sol, thereby liberating the starch granules, separating the starch and washing it with an alkaline medium at a pH of 7.5 to 10.0 to remove coloring matter, and then acidifying and drying the starch.

HARVEY K. MURER.
WILLIAM A. MITCHELL.

REFERENCES CITED

The following references are of record in the file of this patent:

UNITED STATES PATENTS

| Number | Name | Date |
|---|---|---|
| 241,666 | Jebb | May 17, 1881 |
| 239,171 | Jebb | Mar. 22, 1881 |
| 345,409 | Birge | July 13, 1886 |
| 362,502 | Graves | May 10, 1887 |
| 1,681,118 | Jaschke | Aug. 14, 1928 |
| 2,132,251 | Wagner | Oct. 4, 1938 |